(12) United States Patent
Li et al.

(10) Patent No.: US 8,122,008 B2
(45) Date of Patent: Feb. 21, 2012

(54) JOINING TABLES IN MULTIPLE HETEROGENEOUS DISTRIBUTED DATABASES

(75) Inventors: Ming Li, Beijing (CN); Hai Feng Li, Beijing (CN); Yun Feng Sun, Beijing (CN); Sheng Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 12/565,260

(22) Filed: Sep. 23, 2009

(65) Prior Publication Data

US 2010/0082671 A1 Apr. 1, 2010

(30) Foreign Application Priority Data

Sep. 26, 2008 (CN) .......................... 2008 1 0166365

(51) Int. Cl.
G06F 17/30 (2006.01)
(52) U.S. Cl. ........ 707/714; 707/713; 707/769; 707/791; 707/803
(58) Field of Classification Search .................. 707/713, 707/714, 769, 791, 803
See application file for complete search history.

(56) References Cited

OTHER PUBLICATIONS

Zachary G. Ives et al; An adaptive query execution system for data integration; SIGMOD 1999; Philadelphia, PA.

Chiang Lee et al; Minimization of Resource Consumption for Multidatabase Query Optimization; Proceedings of the 18th International Conference on Data Enginerring (ICDE '02); Copyright 2002 IEEE, Sep. 26, 2011.

Amol Deshpande et al; Decoupled Query Optimization for federated Database Systems; Proceedings of the 18th International Conference on Data Enginerring (ICDE '02); Copyright 2002 IEEE.

Donald Kossmann et al; Iterative Dynamic Programming: A new class of query optimization algorithms; ACM Transactions on Database Systems; Mar. 1, 2000; Copyright 2000 Association for Computing Machinery, Inc.

*Primary Examiner* — Shahid Alam
*Assistant Examiner* — Andalib Lodhi
(74) *Attorney, Agent, or Firm* — Steven L. Nichols; Van Colt, Bagley, Cornwall & McCarthy P.C.

(57) ABSTRACT

A method for joining tables in multiple heterogeneous distributed databases implemented by at least two data sources accessible to a federal database server over a network includes: transmitting from the federated database server a sub-command to a first of the data sources responsive to the federated database server receiving a data query; retrieving, with the federated database server, block data from the first data source related to the data query using block fetching according to the sub-command; transmitting, with the federated database server, at least a portion of the block data to a second of the data sources together with an instruction for the second data source to perform a join operation on the portion of the block data and a data table stored by the second data source related to the query; and retrieving a result of the join operation with the federated database server.

15 Claims, 5 Drawing Sheets

JOINING TABLES IN MULTIPLE HETEROGENEOUS DISTRIBUTED DATABASES

CROSS-REFERENCE TO RELATED APPLICATIONS

The present application claims priority from Chinese Patent Application No. 200810166365.6, which has a priority date of Sep. 26, 2008 and is incorporated herein by reference in its entirety.

BACKGROUND

Aspects of the present invention relate generally to database information management systems, and particularly to joining tables in multiple heterogeneous distributed databases.

In a large modern enterprise, it will be almost inevitable that different portions of an organization use different database management systems (DBMS) to store and retrieve their critical data. Yet it is only by combining the information from these systems that the organization can realize the full value of the data.

For example, in the finance industry, mergers are an almost commonplace occurrence. A newly created organization will inherit the databases of the original organization. Many of those databases are relational databases, but from different manufacturers. As such, they may have one or more database management systems. Each database may have different applications for computing important information. After the merger, the new organization may need to be able to access all customer information from all databases, analyze new data using existing and new applications, and use the combined resources of both organizations through a common interface. The new organization may further need to be able to identify common customers of them and consolidate their accounts, although different organizations may have referred to their customers using totally different identifying keys in different databases.

It can be seen that a continuing demand exists to join multiple heterogeneous distributed databases so as to enable transparent access to data stored therein. "Transparent" herein implies that an application program at a specific site is able to access data from all connected databases, without being aware of the origin of the data, nor of any incompatibilities which might exist between a local database and any of the plurality of connected remote databases. Say, if a database system is transparent, it masks from the user the differences, idiosyncrasies, and implementations of the underlying data sources.

In order to provide a transparent interface for multiple heterogeneous databases, in prior art one separated database is generally employed as a unified interaction interface, and is enabled, under the control of a database management system, to access data from other databases in accordance with data entries contained in an interface table. The current design of such system is called as a federated database server. Federation technologies can significantly ease the integration of heterogeneous data by providing a unified interface to diverse data. Today, federation technologies enable unified access to any digital information, in any format (structured and unstructured) in any information store.

BRIEF SUMMARY

A method for joining tables in multiple heterogeneous distributed databases implemented by at least two data sources accessible to a federal database server over a network includes: transmitting from the federated database server a sub-command to a first of the data sources responsive to the federated database server receiving a data query; retrieving, with the federated database server, block data from the first data source related to the data query using block fetching according to the sub-command; transmitting, with the federated database server, at least a portion of the block data to a second of the data sources together with an instruction for the second data source to perform a join Operation on the portion of the block data and a data table stored by the second data source related to the query; and retrieving a result of the join operation with the federated database server.

A system for joining tables in multiple heterogeneous distributed databases includes: a first data source; a second data source; and a federated database server communicatively coupled to the first and second data sources over a network. The federated database server is configured to: transmit a sub-command to the first data source responsive to receiving a data query; retrieve block data from the first data source related to the data query using block fetching according to the sub-command; transmit at least a portion of the block data to the second data source together with an instruction for the second data source to perform a join operation on the portion of the block data and a data table stored by the second data source related to the query; and retrieve a result of the join operation from the second data source.

A computer program product for joining tables in multiple heterogeneous distributed databases implemented by at least two data sources includes a computer readable storage medium having computer readable program code embodied therewith. The computer readable program code includes: computer readable program code configured to transmitting a sub-command to a first of the data sources responsive to receiving a data query; computer readable program code configured to retrieve block data from the first data source related to the data query using block fetching according to the sub-command; computer readable program code configured to transmit at least a portion of the block data to a second of the data sources together with an instruction for the second data source to perform a join operation on the portion of the block data and a data table stored by the second data source related to the query; and computer readable program code configured to retrieve a result of the join operation.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As described above, a continuing demand exists to join multiple heterogeneous distributed databases so as to enable transparent access to data stored therein. In response to this demand and other considerations, the present specification discloses methods, systems, and computer program products for performing such join operations.

The methods, systems, and computer program products described herein provide numerous advantages over previous methods for joining multiple heterogeneous distributed databases. Particularly, as will be explained in more detail below, the principles of the present specification enable the number of physical accesses to an inner table to be greatly reduced during the join operation, thereby reducing the disk input/output cost of at least one data source implementing a database subject to the join operation. Further, the principles described herein also provide for a reduced communication cost between a federated database server facilitating the join and remote data sources.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The exemplary embodiments of the invention will be described below in conjunction with the accompanying figures. For clarity and simplicity, not all features of the actual implementation are described in the specification. However, it should be appreciated that many implementation-specific decisions must be made in the procedure of developing any of such actual embodiments in order to realize the particular objectives of developers, for example complying with those limiting conditions in related to systems and businesses, wherein the limiting conditions may be varied depending on the implementation. Further, it should be appreciated that although the development effort may be complicated and time-consuming, such development effort is only a routine task for those skilled in the art that benefit from this disclosure.

Moreover, it is further noted that, in order not to obscure the invention by those unnecessary details, only the apparatus structures and/or processing steps in related to the scheme according to embodiments of the invention are shown in the accompanying figures, while other details not relative to the invention are omitted.

Figure 1:
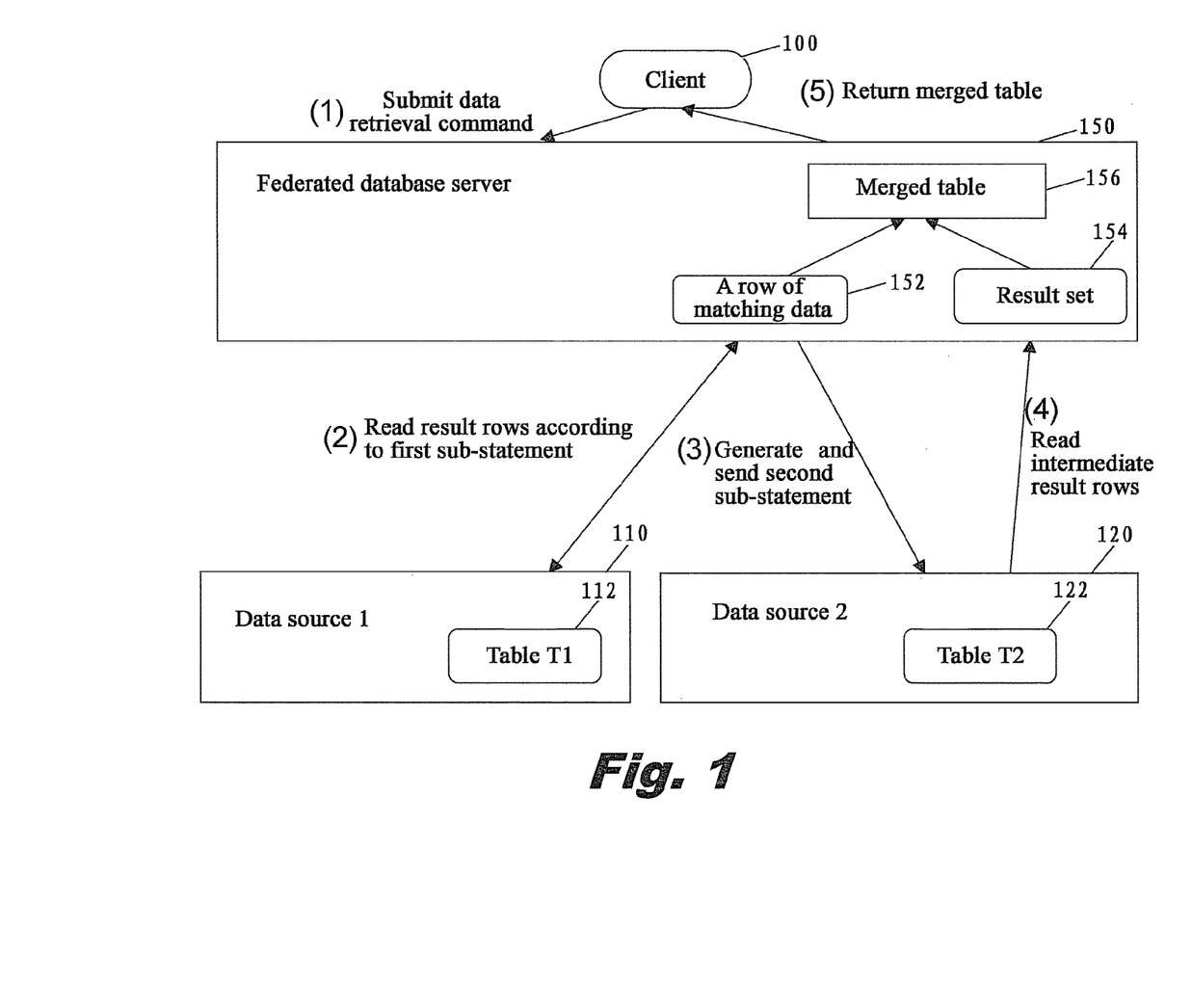
FIG. 1 illustrates a schematic block diagram of an interaction process for implementing a prior art method for joining tables in multiple heterogeneous distributed databases.

Referring to FIG. 1, there is illustrated a schematic block diagram of an interaction process for implementing a method for joining tables in multiple heterogeneous distributed databases in prior art. As shown in FIG. 1, a federated database server 150 communicates respectively with a client 100, a data source 1 110, a data source 2 120 located remotely through a network, which may be a Local Area Network (LAN), Wide Area Network (WAN), Virtual Private Network (VPN), and Internet. Two data sources are two remote databases, in which the data source 1 110 contains a table T1 112, the data source 2 120 contains a table T2 122. It is noted that, for conciseness, in the context of this example and the present invention, only two data sources are taken for explanations. Of course, it can be understood by those skilled in the art that the scheme according to the embodiments of the invention can be equally well applied to multiple databases and multiple tables stored thereon.

At first, at Step 1, a user of the client 100, through an application running thereon, submits a data retrieval command to the federated database server 150. For example, the submitted command may be the following SQL query statement: select T1.C1, T1.C2, T2.C2 from T1, T2 where T1.C1=T2.C1.

The statement intends to retrieve the data T1.C1, T1.C2 from the table T1 112, and the data T2.C2 from the table T2 122. And the retrieved data should further match the condition of T1.C1=T2.C1. The result expected by the user is a joined result table, in which each row contains the matching data from the table T1 112 and the table T2 122.

The federated database server 150 is responsible for processing the SQL query statement received from the client 100, and determining a best performing method for accessing the requested data through a query optimizer (not shown). During the query optimization operation, various types of join methods and the join sequence are often considered. The join methods for example may comprise merged join, nested loop join, etc. A join method is used when rows from an "outer table" are to be concatenated to rows of one or more other tables (i.e., "inner tables"). As used herein, the term "table" includes any tabular listing of data. The term "outer table" is referred to a table from which a search name is retrieved directly by a database application; and the term "inner table" is referred to a table from which data is further retrieved by a database application, based on the search name retrieved from the outer table. The method for joining tables in multiple heterogeneous distributed databases as illustrated in FIG. 1 is a method that is often selected by the query optimizer.

When the received SQL query statement is a "join SQL query statement" (a "join SQL query statement" means that the SQL query statement is related to data from at least two data sources), the federated database server 150 will need to perform a join operation on the retrieved data of the tables in at least two different remote heterogeneous databases (data sources). Thus, in this example, the query optimizer usually first divides the received SQL query statement into two SQL sub-statements, each of which depicts the operation to be performed on each remote database respectively.

For example, in this example, the divided first SQL sub-statement is:
select T1.C1, T1.C2 from T1.
The statement is for selecting the data T1.C1, T1.C2 from the table T1 112.

Also, the divided second SQL sub-statement is:
select T2.C2 from T2 where T2.C1=X.

The statement is for selecting the data T2.C2 from the table T2 122, in which the selected data should match the condition of T2.C1=X, wherein X indicates T1.C1, resulted from the table T1 by the first SQL sub-statement.

It is the query optimizer that decides whether by the server 150 or by the data source where the data is stored the different operations involved in the query should be done. In order to make a decision, the optimizer must be aware of what each data source can do, and how much it costs. For example, if the data source is only a file, then the server cannot ask it to perform a sort or to apply some function. On the other hand, if the data source is a relational database system capable of applying predicates and doing join operations, it will be a good idea to take advantage of the power of the database system if it can perform some processing remotely so as to reduce the amount of data that must be returned to the server 150. The decision will typically depend on the details of the individual queries. Assuming herein that the data source 2 120 is a relational database system, which can perform necessary data query operations and perform complex function computations, the federated database server 150 will enable the data source 2 120 to perform some specific processing so as to reduce the computation cost of the server 150 and the communication cost between them.

Continuing to refer to FIG. 1, at Step 2, the federated database server 150 sends the first SQL sub-statement to the data source 1 110, and gets the matching retrieval result back from the data source 1 110. The data source 1 110 queries the table T1 according to the received first SQL sub-statement, and every time returns a row of matching data 152 to the server 150 as the retrieval result, e.g. a row of specific data T1.C1, T1.C2.

At Step 3, for each row of the obtained matching retrieval result, the federated database server 150 generates the second SQL sub-statement with the data contained in the row. The generation is performed by taking the corresponding column in the row obtained by the first SQL sub-statement as a bind parameter to generate the second SQL sub-statement. That is, the parameter of X in the second SQL sub-statement is replaced with the value of retrieved T1.C1. Then the federated database server 150 sends the generated second SQL sub-statement to the data source 2 120.

At Step 4, the data source 2 120 traverses the table T2 122 according to the received second SQL sub-statement, and returns the result set 154 matching the sub-statement to the federated database server 150 as the retrieval result. The result set is referred to as intermediate result rows. The server 150 reads the intermediate result rows returned from the data source 2 120.

Then at Step 5, the federated database server 150 merges the returned intermediate result rows with the row of data read from the data source 1 110 by the first SQL sub-statement, to generate a merged table 156. Then the federated database server 150 returns the merged table 156 to the client 100.

Steps 2-5 will be performed repeatedly, until all available matching data in the table T1 112 has been retrieved completely according to the first SQL sub-statement and the retrieval of the table T2 122 and the merging of the two retrieval results are performed accordingly.

The problem for the above implementation is that, for each row obtained from the outer table T1 112 of the data source 1 110, the federated database server 150 needs to communicate with the data source 2 120 where the inner table T2 122 locates, and scan every row throughout the inner table to get the corresponding matching data. It is called as a Nested Loop Join. During such process, since the inner table will be traversed repeatedly for many times, when the data of the table cannot be fully loaded into the memory of the data source 2 120, it will bring very high disk input/output (I/O) cost on the data source 2 120. Further, along with the continuous enlargement of the inner table, such I/O cost will influence the performance more significantly. Moreover, the above process may bring very high communication cost since the SQL statements and returned results are to be transmitted continuously between different physical machines (the server 150, data source 1 110, data source 2 120).

As mentioned above, the objective of the present invention is to provide a method and system for optimizing join operations on tables in multiple heterogeneous distributed databases, which can reduce the disk I/O cost of the data source and the communication cost between different physical machines, so that it is possible to perform improved join operations on tables in multiple databases.

The main improvements of the scheme of the present invention are in that, after the federated database server receives the SQL command from the user and generates a sub-command for the data source 1, it reads data from the outer table in the data source 1 in a manner of block fetching; a temporary table for performing the join operation with the inner table is created on the data source 2, wherein the temporary table stores the block data of the data source 1 received from the server (at least containing those columns related to the join operation); instead of scanning the whole inner table for each row from the outer table, the hash join or block nested loop join is performed on the data in the temporary table and the local data in the inner table of the data source 2; and the joined result is returned to the server. With the improved method, the number of physical accesses to the inner table can be greatly reduced thereby reducing the disk I/O cost of the data source 2. Optionally, those columns in the block data from the data source 1 that are not related to performing the join operation are kept in the server rather than transmitted to the data source 2, and those non-related columns are replaced with an additional row pointer column. Thus, the communication cost between the federated database server and the remote data source is reduced.

Figure 2:
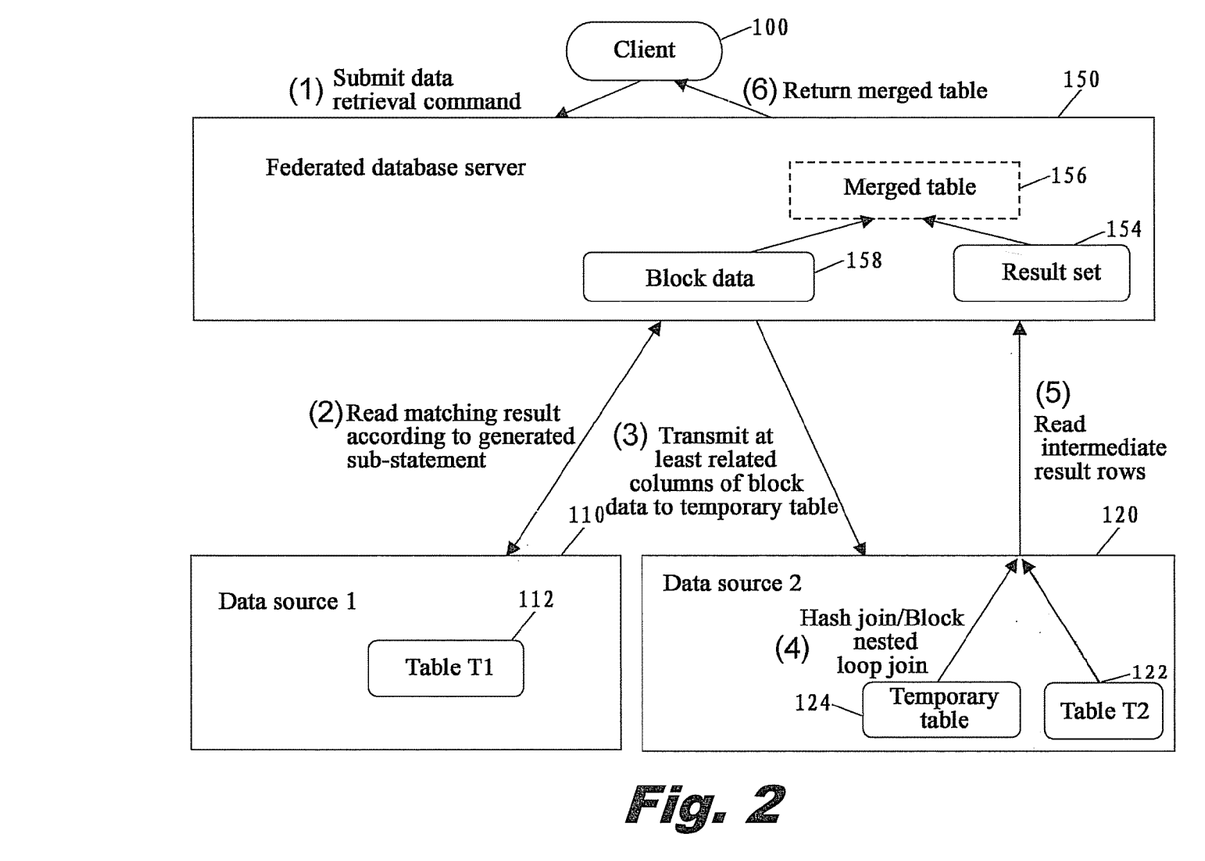
FIG. 2 illustrates a schematic block diagram of implementing a method for joining tables in multiple heterogeneous distributed databases according to an embodiment of the present invention and an interaction process between various components.

In particular, referring to FIG. 2, there is illustrated a schematic block diagram of implementing a method for joining tables in multiple heterogeneous distributed databases according to an embodiment of the present invention and an interaction process between various components. The example in FIG. 1 is employed again. As shown in FIG. 2, a federated database server 150 communicates with a client 100, a data source 1 110, a data source 2 120 located remotely, respectively.

At first, at Step 1, a user of the client 100, through an application running thereon, submits a data retrieval command to the federated database server 150. For example, the submitted command may be the following SQL query statement: select T1.C1, T1.C2, T2.C2 from T1, T2 where T1.C1=T2.C1.

The statement will retrieve the data T1.C1, T1.C2 from the table T1 112, and the data T2.C2 from the table T2 122, and the retrieved data should further match the condition of T1.C1=T2.C1. The result expected by the user is a joined result table, in which each row contains the matching data from the table T1 112 and the table T2 122.

When the received SQL query statement is determined as a "join SQL query statement", the query optimizer first generates a SQL sub-statement for the operation of the remote data source where the outer table (the table T1) locates according to the received SQL query statement.

For example, in this example, the generated SQL sub-statement is: select T1.C1, T1.C2 from T1. The statement is for selecting the data T1.C1, T1.C2 from the table T1 112.

At Step 2, the federated database server 150 sends the SQL sub-statement to the data source 1 110, and obtains the matching retrieval result returned from the data source 1 110. The data source 1 queries the table T1 according to the received SQL sub-statement, and every time returns a block of data 158 (rather than a row of data) to the server 150 as the retrieval result in a manner of block fetching, for example, every time returns 100 specific data T1.C1, T1.C2. How to determine the row number of the block to be read will be described in detail hereinafter.

The federated database server 150 reads the data of the table T1 112 from the data source 1 110 in blocks, and stores the read block data 158. The row number of the block data that is read every time can be determined by: the query optimizer calculating the maximal row number through dividing the maximal memory size available for performing the hash join operation or block nested loop join operation by the maximal row size of the temporary table to be established in the data source 2 120 (if the data source 2 120 supports the hash join or block nested loop join), and the maximal row number through dividing the maximal memory size of the available local cache of the server 150 by the maximal row size of the read block data, then taking the smaller row number value between them as the readable row number of the block data, thereby obtaining the maximal readable row number of the block. The maximal memory size in the data source 2 120 available for calculating the hash join or block nested loop join can usually be marked with an option (attribute value) for this kind of data source; while the maximal memory size of the available local cache of the server 150 usually exists as a parameter of the database management system. Both of them can be obtained easily.

The federated database server 150 obtains data from the data source 1 110 in block fetching based on the maximal row number determined above. The block fetching will stop when either all data in the data source 1 110 has been read completely or the maximal row number for block fetching is reached.

At Step 3, the federated database server 150 transmits the block data obtained from the data source 1 110 as the retrieval result to the data source 2 120, and inserts it into a temporary table 124 created in the data source 2 120.

Optionally, in order to reduce the communication cost between the federated database server 150 and the data source 2 120, those non-related columns in the block data from the data source 1 can be kept at the server side rather than transmitted to the data source 2 120, and those non-related columns are replaced with an additional row pointer column. The non-related columns refer to those columns that are not related to the join operation to be performed on the table in the second data source, for example, T1.C2 in the above example. With the row pointer column, only those columns related to the join operation can be contained in the created temporary table 124, and it is not necessary to perform on the server 150 again the join operation on the block data returned from the data source 1 with the intermediate result columns returned from the data source 2 (which will be time-consuming). The row pointer column is an additional column in the temporary table which uniquely identifies respective rows in the block data from the data source 1. The query optimizer first determines whether the size of the row pointer is larger than the size of the columns that are not related to the join operation or not. Because there may be no non-related column or only a few in the block data 158, at this point the row pointer becomes unnecessary. In this example, the column that is not related to performing the join operation is T1.C2. If the column of T1.C2 is larger than the row pointer column, then the column of T1.C2 will be kept in the server 150, and the row pointer column will be added into the temporary table 154. Thus, when the intermediate result columns obtained from the data source 2 are returned to the server 150, it is not necessary to join it with the block data from the data source 1. Instead, the block data and the intermediate result columns having the same row point are merged directly. Doing this will greatly save the computing cost of the server 150.

It is noted that the determination as to whether to use the row pointer column may also influence the previously determined maximal row number of the block to be read from the data source 1. In particular, if it is determined to use the row pointer column, the columns in the temporary table are less, thus the maximal row number through dividing the available maximal memory size in the data source 2 120 by the maximal row size of the temporary table is larger. On the contrary, the determined maximal row number is smaller. Hence, in the process of comparing the determined maximal row number with the maximal row number through dividing the maximal memory size of the available local cache of the server 150 by the maximal row size of the read block data, different results may be produced. It can be seen that the determination as to whether to use the row pointer column should be made prior to the determination of the block fetching operation on the data source 1, i.e. prior to the block fetching, the federated database server reads the attributes of the related columns of the table T1 from the data source 1, to determine whether to use the row pointer column, thus further determining the maximal row number of the block to be read.

The query optimizer also needs to determine whether the hash join or the block nested loop join operation is supported by the data source 2 120, which is usually marked with the attribute value for this kind of data source. A hash join operation comprises the following steps: performing the hash algorithm on the temporary table 124 to form a hash table, so that the original columns having the same or similar hash result value will be considered as the same hash columns; thus, first comparing the hash table with the table T2 122, and then in the case that the result value is matching, searching the temporary table 124 for the corresponding matching columns; afterwards, performing the join operation on the matching columns in the temporary table 124 and the table T2 122 to obtain the result set. With the hash join operation, without traversing the whole inner table T2 for many times, it is possible to query the matching columns therein and perform the join operation, thereby greatly reducing the disk I/O cost. The above-mentioned hash join operation is particular applicable in any of the following cases or the combination of some of them: there is no index in the table T2, the table T2 is very large. In the above cases, the computing cost saved by the hash join operation is more significant.

Continuing to refer to FIG. 2, at Step 4, if the data source 2 120 supports the hash join, the hash join operation is performed on the data in the temporary table 124 and the table T2 122, to generate the result set, i.e. the intermediate result rows. According to the determination of the size of the block data, since the size of the temporary table 124 is not larger than the maximal memory size in the data source 2 120 available for performing the hash join, the data source 2 120 can use the data in the temporary table 124 in the hash join directly. During the hash join operation, it is only needed to scan the original inner table (the table T2) once.

If the data source 2 120 does not support the hash join, the block nested loop join operation is performed on the data in the temporary table 124 and the table T2 122, to generate the result set. The implementation of such operation is similar to the conventional nested loop join operation, so it is not described in detail herein.

At Step 5, the federated database server 150 reads the intermediate result rows returned from the data source 2 120 as the result set 154.

Afterwards, at Step 6, if the row pointer column is used in the temporary table 124, the server 150 merges the result set 154 with the block data 158 directly to form the merged table 156. Due to the uniqueness of the row pointer column, the cost of performing the merging is very low. If no row pointer column is used in the temporary table 124, which indicates that all columns in the block data 158 are stored in the temporary table 124 and performed the join operation, then the returned result set 154 can be taken as the merged table 156 directly. The federated database server 150 returns the merged table 156 to the client 100.

Steps 2-6 will be performed repeatedly, until all available matching data in the table T1 112 has been retrieved completely according to the above SQL sub-statement and the retrieval and join of the table T2 122 and the merging of the two retrieval results are performed accordingly.

It is noted that, it can be readily apparent for those skilled in the art that the method of the invention can be equally applicable in the case of more than two remote data sources. For example, if there are three data sources, the federated database server may generate a SQL sub-command for the first data source according to the SQL query command. First, based on the SQL sub-command, the process of the same join operation as above (the hash join operation or block nested loop join operation) is completed for the first and second data sources. Then, the result set received from the second data source is looked upon as another block data, and all columns of the block data (or only related columns and an additional row pointer column) are transmitted to the third data source and inserted into a temporary table, for performing the join operation with the data in the third data source. The remaining process is similar to that for the two data sources as mentioned above, and is not described in detail herein.

Figure 3A:
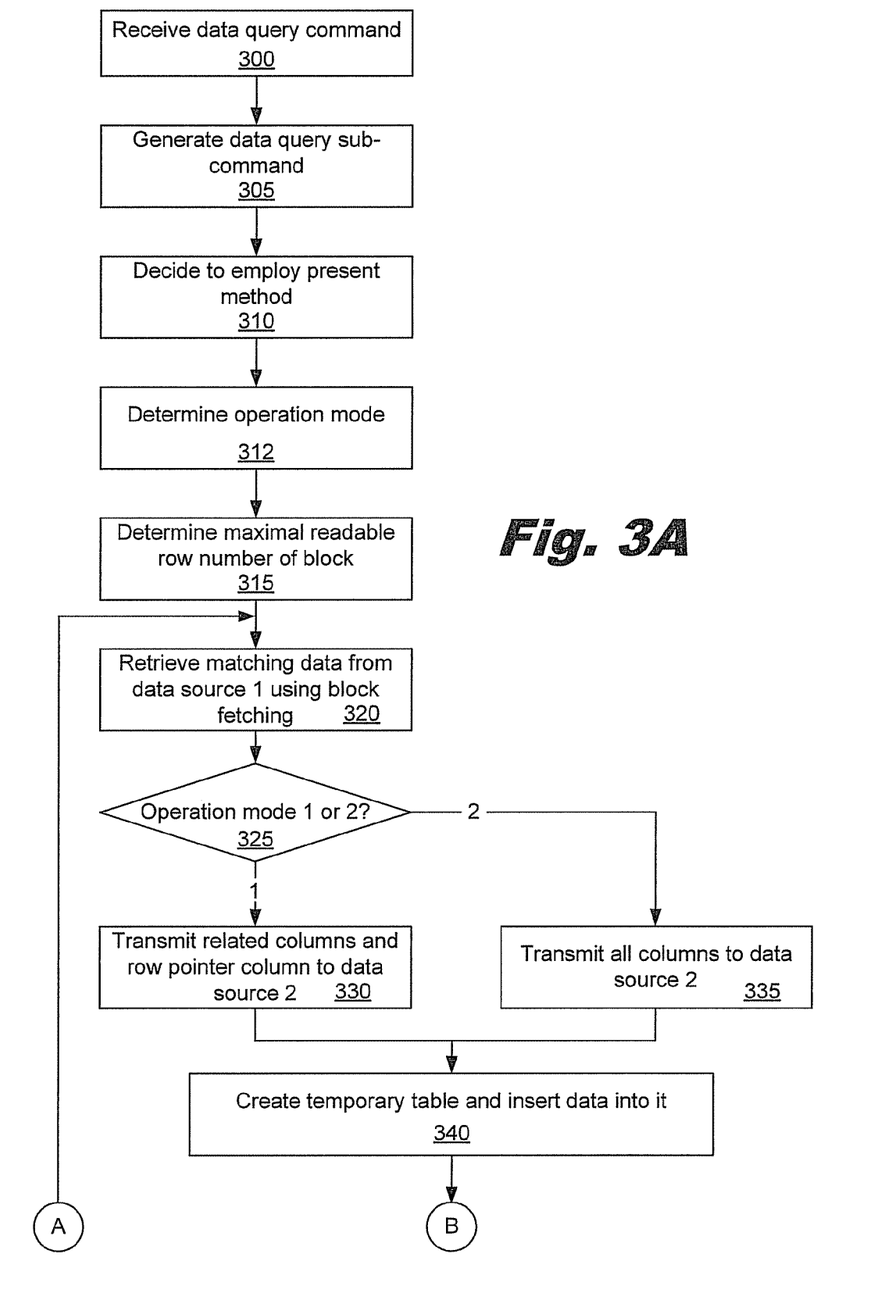
FIGS. 3A and 3B collectively illustrate a flowchart of a method for joining tables in multiple heterogeneous distributed databases according to an embodiment of the present invention.
Figure 3B:
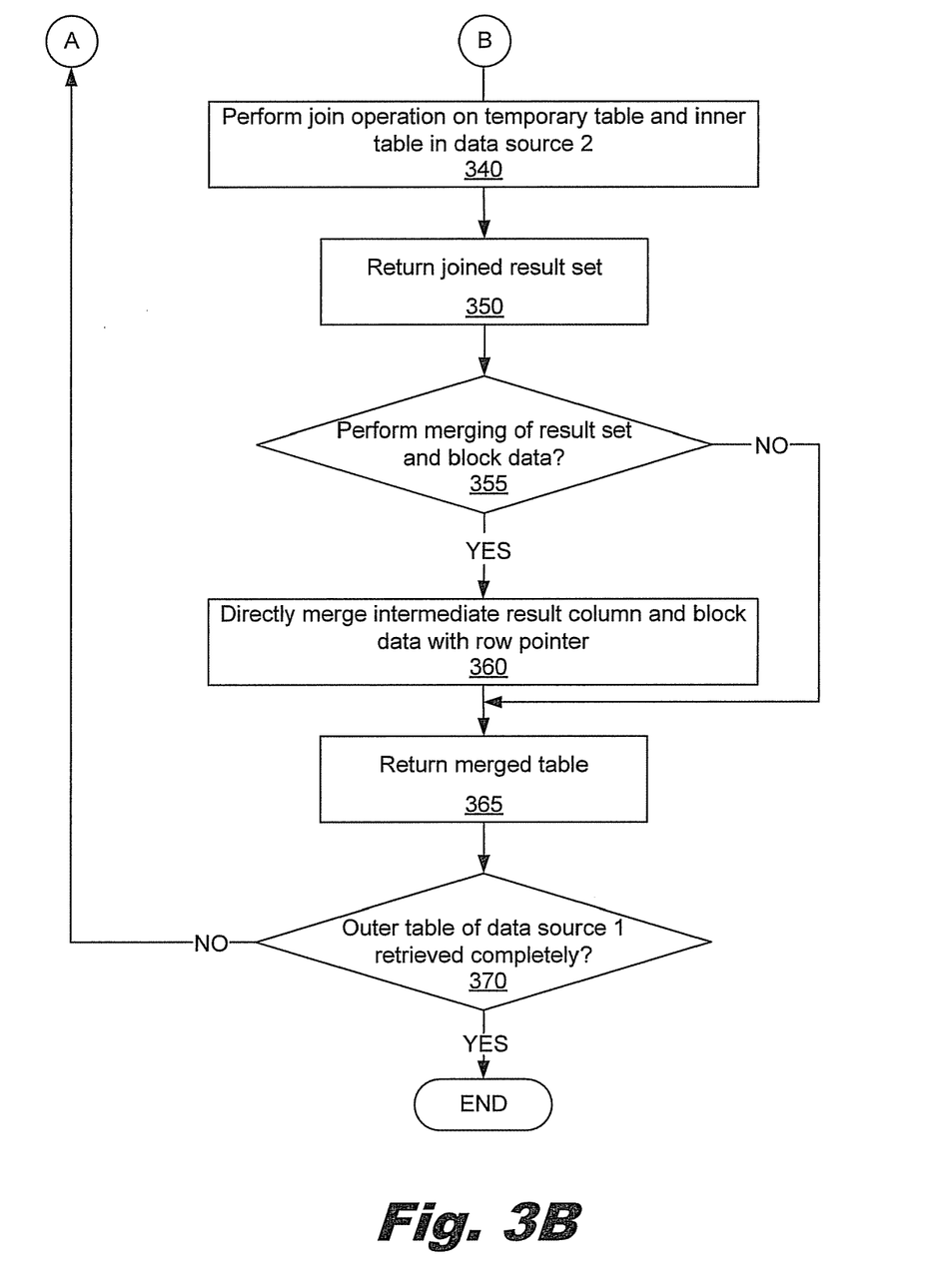

A detailed flowchart of a method for joining tables in multiple heterogeneous distributed databases according to an embodiment of the present invention is described herein below with reference to FIGS. 3A and 3B and in conjunction with a simple example. For example, a SQL query command sent from the client 100 to the federated database server 150 is:

select A.A1, A.A2, A.A3, B.B2 from A, B where A.A3=B.B1.

The SQL statement will retrieve the data A.A1, A.A2, A.A3 from the table A, and the data B.B2 from the table B, and the condition of A.A3=B.B1 should be matched. For the conciseness of the description, it is assumed that the columns of A.A3 and B.B1 are of the type of integer (INT), and the values of A.A3 are distributed among 1 to 10 uniformly. An exemplary table A is shown as the following Form 1 (totally 200 rows).

TABLE A

| Form 1: | | |
| --- | --- | --- |
| Column A1 | Column A2 | Column A3 |
| X1 | Y1 | 1 |
| X2 | Y2 | 2 |
| ... | ... | ... |
| X10 | Y10 | 10 |
| X11 | Y11 | 1 |

TABLE A-continued

Form 1:

| Column A1 | Column A2 | Column A3 |
|---|---|---|
| X12 | Y12 | 2 |
| ... | ... | ... |
| X20 | Y20 | 10 |
| ... | ... | ... |
| ... | ... | ... |
| X198 | Y198 | 8 |
| X199 | Y199 | 9 |
| X200 | Y200 | 10 |

An exemplary table B is shown as the following Form 2 (totally 10000 rows, herein only the processing of 2 random rows in the table B will be described in detail).

TABLE B

Form 2:

| Column B1 | Column B2 |
|---|---|
| ... | ... |
| ... | ... |
| 10 | Z1000 |
| ... | ... |
| 2 | Z5000 |
| ... | ... |

First at Step 300, the federated database server receives from the client a data query command, which may be in the format of SQL. Then at Step 305, after determining the received SQL query statement is a "join SQL query statement", the server generates a SQL sub-statement for the table A according to the SQL query statement, in which the sub-statement describes the operation to be performed on the remote database where the table A is saved.

At Step 310, the federated database server decides to employ the method of the present invention to process the query. As mentioned above, there are many methods for performing the "join SQL query statement" (i.e. for joining tables from multiple data sources). An optimizer of the federated database server will choose one method with the best performance among them. In some scenarios, the method according to the present invention will hold the best performance. For example, when the correlation degree of two tables to be joined is very low, the optimizer could determine to perform the join operation on the remote data source instead of on the federated database server. In such scenario, the improved method according to the present invention will achieve the best effect, such that the optimizer will choose to employ this method.

At Step 312, the operation mode of table join is determined. The determination of the operation mode is on the basis of whether the size of the row pointer is larger than that of the non-related columns. The non-related columns refer to those columns that are not related to the join operation to be performed on the inner table in the data source 2. If not, then the non-related columns will be replaced with the row pointer column in the temporary table. Such case can be marked as an operation mode 1. If yes, then, instead of using the row pointer column, all columns in the block data from the data source 1 will be used in the temporary table. Such case can be marked as an operation mode 2.

At Step 315, it is calculated the maximal row number through dividing the maximal memory size in the remote data source 2 available for calculating the hash join or block nested loop join by the maximal row size of the temporary table to be established in the data source 2, and the maximal row number through dividing the maximal memory size of the available local cache of the server by the maximal row size of the read block data. Then the smaller row number value between them is taken as the row number of the block data to be read every time, thereby obtaining the maximal readable row number of the block.

At Step 320, based on the row number of the block data determined above, the matching data is retrieved from the data source 1 in a manner of block fetching according to the generated SQL sub-statement. Assuming that the maximal row number in the cache in the data source 2 available for storing data is relative small, which can only hold 100 rows of data at most, then the block data (also 100 rows) produced by the retrieval of the table A is shown as the following Form 3. In the block data of Form 3, Pn in the first column indicates the address pointer for the $n^{th}$ row of data in the local memory of the server.

| Form 3: block data | | |
|---|---|---|
| | Column A1 | Column A2 |
| P1→ | X1 | Y1 |
| P2→ | X2 | Y2 |
| ...→ | ... | ... |
| P10→ | X10 | Y10 |
| P11→ | X11 | Y11 |
| P12→ | X12 | Y12 |
| ...→ | ... | ... |
| P20→ | X20 | Y20 |
| ...→ | ... | ... |
| ...→ | ... | ... |
| P98→ | X98 | Y98 |
| P99→ | X99 | Y99 |
| P100→ | X100 | Y100 |

At Step 325, it is determined whether the operation mode 1 (using the row pointer column) or the operation mode 2 (using no row pointer column) is employed by the federated database server. If it is the operation mode 1, then the federated database server will replace the non-related columns in the temporary table with the row pointer column. The method proceeds to Step 330, in which the columns related to the join operation, along with the row pointer column, are transmitted to the data source 2, for inserting into a temporary table to be created in the data source 2. If it is the operation mode 2, then the federated database server will not replace the non-related columns with the row pointer column. The method proceeds to Step 335, in which all columns in the block data are transmitted to the data source 2, for inserting into a temporary table to be created in the data source 2.

At Step 340, a temporary table is created in the remote data source 2 and the data is inserted into it. In this example, assuming that the size of the row pointer is smaller than that of the non-related columns (A.A1, A.A2); the temporary table is shown as the following Form 4. In the temporary table, the "row pointer" in the first column indicates the address of the row of the block data in the server corresponding to each row.

| Form 4: temporary table | |
|---|---|
| Row Pointer | A3 |
| P1 | 1 |
| P2 | 2 |
| ... | ... |
| P10 | 10 |
| P11 | 1 |
| P12 | 2 |
| ... | ... |
| P20 | 10 |
| ... | ... |
| ... | ... |
| P98 | 8 |
| P99 | 9 |
| P100 | 10 |

At Step 345, the join operation is performed on the temporary table and the inner table (the table B) in the data source 2. Depending on the processing capability of the data source 2, the join could be the hash join or the block nested loop join. At Step 350, the joined result set is returned to the federated database server 150. The result set returned in the server 150 is shown as the following Form 5.

| Form 5: result set | | |
|---|---|---|
| Row Pointer | A3(=B1) | B2 |
| ... | ... | ... |
| P10 | 10 | Z1000 |
| P20 | 10 | Z1000 |
| ... | ... | ... |
| P100 | 10 | Z1000 |
| ... | ... | ... |
| P2 | 2 | Z5000 |
| P12 | 2 | Z5000 |
| ... | ... | ... |
| P92 | 2 | Z5000 |
| ... | ... | ... |

The result set in Form 5 only illustrates the result obtained after joining the specific two rows of data in the table B. Afterwards, at Step 355, it is determined whether to perform on the server the merging of the result set returned from the data source 2 and the block data returned from the data source 1. If the row pointer is employed (operation mode 1), then at Step 360 it is needed to, with the row pointer, merge the block data and the intermediate result columns having the same row pointer. If no row pointer is employed (operation mode 2), then there is no need to perform the merging and the returned result set can be looked upon as the merged table. For example, the merged table obtained after performing the merging is shown as the following Form 6.

| Form 6: merged table | | | |
|---|---|---|---|
| A1 | A2 | A3(=B1) | B2 |
| ... | ... | ... | ... |
| X10 | Y10 | 10 | Z1000 |
| X20 | Y20 | 10 | Z1000 |
| ... | ... | ... | ... |
| X100 | Y100 | 10 | Z1000 |
| ... | ... | ... | ... |
| X2 | Y2 | 2 | Z5000 |

-continued

| Form 6: merged table | | | |
|---|---|---|---|
| A1 | A2 | A3(=B1) | B2 |
| X12 | Y12 | 2 | Z5000 |
| ... | ... | ... | ... |
| X92 | Y92 | 2 | Z5000 |
| ... | ... | ... | ... |

Then at Step 365, the server returns the merged table to the client. At Step 370, the server determines whether the outer table (the table A) of the data source 1 has been retrieved completely. If not, the method returns to Step 320 and repeats Steps 320-365. If yes, the method proceeds to Step 375 and ends.

According to the above assumption, at most only 100 rows of data can be read from the table B in the remote data source 2 every time. Thus, the reading of the whole table B will cost 100 times (i.e., reading 100 blocks, totally 10000 rows). To perform the hash join operation on the table A and table B once, only 2 (the table A is read in two blocks, and for each block, it is only needed to read the table B once)*100 I/O operations will be needed for the table B. For the method in prior art, however, 200 (for each row of the table A, it is needed to traverse the table B once)*100 I/O operations will be needed for the table B. Therefore, it can be seen that the scheme according to the present invention can significantly reduce the disk I/O operations on the data source 2 while keeping the performance indices on the data source 1 and the server almost invariable, thereby greatly improving the performance of the join operation. Moreover, the larger the table B is, the more distinct the advantage achieved by the method of the invention is.

The method for joining tables in multiple heterogeneous distributed databases according to an embodiment of the present invention is illustrated hereinabove in conjunction with an example and with respect to the accompanying figures. Under the same inventive concept, there is also proposed a system for joining tables in multiple heterogeneous distributed databases according to an embodiment of the present invention.

Figure 4:
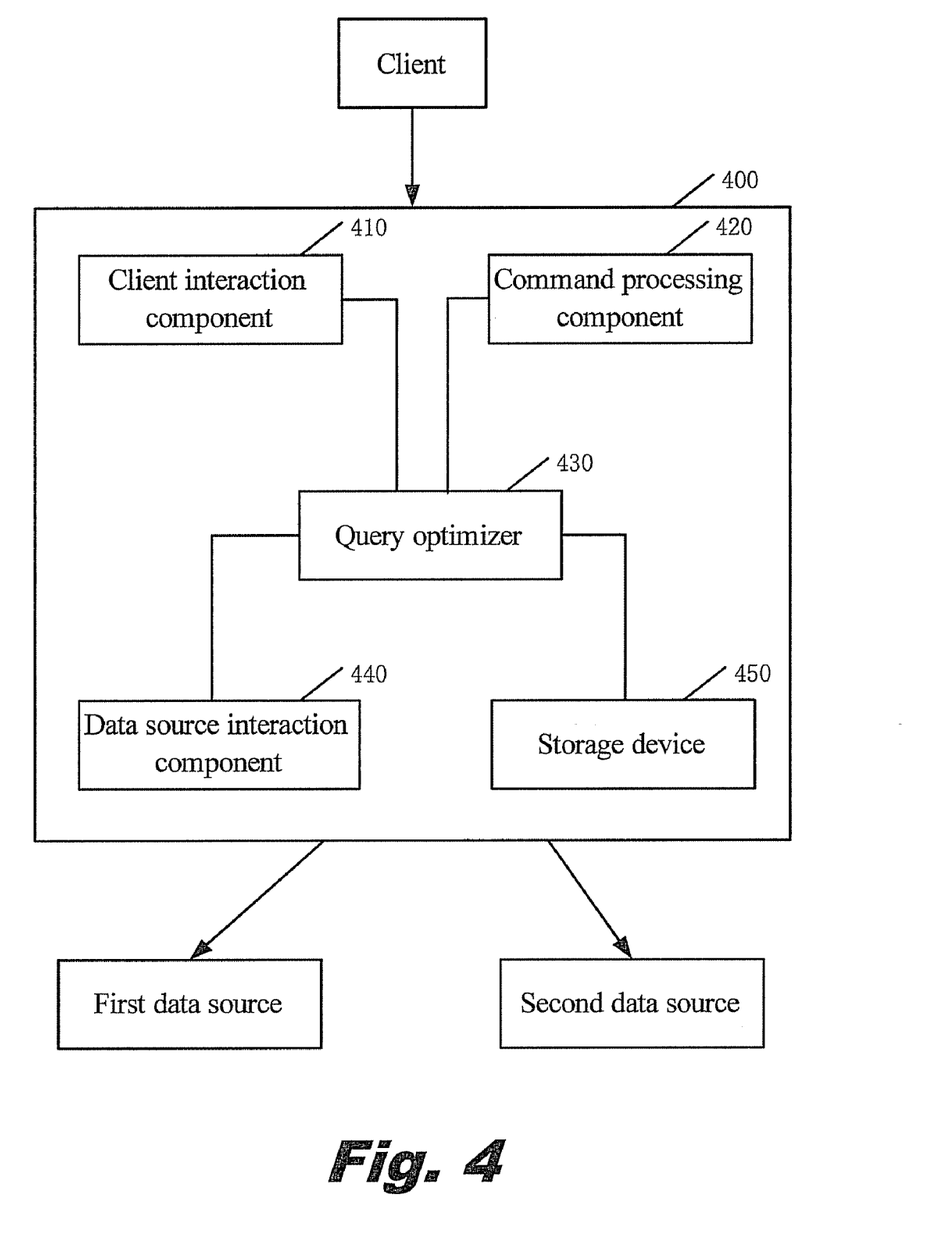
FIG. 4 illustrates a schematic block diagram of a system for joining tables in multiple heterogeneous distributed databases according to an embodiment of the present invention.

FIG. 4 illustrates a schematic block diagram of a system 400 for joining tables in multiple heterogeneous distributed databases according to an embodiment of the present invention. As shown in FIG. 4, the system 400 communicates with a client, a first data source, a second data source located remotely through a network. The system 400 comprises a client interaction component 410, a command processing component 420, a query optimizer 430, a data source interaction component 440, and a storage device 450. The system 400 for example may be the federated database server 150 as shown in FIG. 2.

In particular, the client interaction component 410 is configured for receiving from the client a data query command, which is related to data from at least two remote data sources (the first data source, the second data source).

The command processing component 420 is configured for, in response to receiving the data query command, generating a sub-command for the first data source according to the data query command.

The data source interaction component 440 is configured for: according to the sub-command, retrieving matching data from the first data source in a manner of block fetching; transmitting at least related columns in the retrieved block data to the second data source and inserting them into a temporary table, for performing a join operation with a table in the second data source, wherein the related columns refer to those columns related to the join operation; and receiving a joined result set from the second data source. The join operation may be a hash join operation or a block nested loop join operation.

The query optimizer 430 is configured for optimizing and coordinating the operations and interactions between various components in the system 400. In particular, the query optimizer 430 can be configured for: determining the size of the block data read from the first data source before retrieving the matching data from the first data source in a manner of block fetching. The determination is performed by: calculating the maximal row number through dividing the maximal memory size in the second data source available for performing the join operation by the maximal row size of the temporary table to be established in the second data source, and the maximal row number through dividing the maximal memory size of the available local cache by the maximal row size of the read block data, and taking the smaller row number value between them as the readable row number of the block data. The query optimizer 430 can be further configured for: in response to the size of non-related columns in the block data read from the first data source being larger than that of a row pointer column, only transmitting the related columns in the block data along with the row pointer column to the second data source and inserting them into the temporary table, wherein the non-related columns refer to those columns that are not related to the join operation to be performed on the table in the second data source, the row pointer column uniquely identifies respective rows in the block data from the first data source; and according to the row pointer column, directly merging the joined result set received from the second data source with the block data retrieved from the first data source, to form a merged table.

The query optimizer 430 can be further configured for: in response to the size of the non-related columns in the block data read from the first data source being smaller than that of a row pointer column, transmitting all columns in the block data to the second data source and inserting them into the temporary table; and directly storing the joined result set received from the second data source as a merged table.

The storage device 450 is for storing the block data returned from the first data source, the joined result set returned from the second data source, and the merged table by joining them.

The method and system for joining tables in multiple heterogeneous distributed databases according to an embodiment of the present invention are described in detail hereinabove. As appreciated by the person with ordinary skills in the art, the present invention may be embodied as a method, a system, and/or a computer program product. Therefore, the present invention can be embodied in the form of entire hardware, entire software, or the combination of software and hardware. Additionally, the present invention may be embodied as a computer program product contained on machine-readable media where the computer executable program instructions for programming a computer system to execute the process according to an embodiment of the invention are stored. The term "machine-readable media" used herein include any media that provide the computer system with instructions for execution. Such media may take various forms, including but not limited to: non-volatile media, volatile media, and transmission media. Non-volatile media commonly comprise, for example, floppy disk, floppy magnetic disk, hard disk, magnetic tape, or any other magnetic media, CD-ROM or any other optical media, slotting card or any other physical media with hole pattern, PROM, EPROM, EEPROM, flash memory, any other memory chip or cartridge, or any other media that can be read by the computer system and are appropriate for storing instructions.

A data processing system suitable for storing and/or executing program code will include at least one processor coupled directly or indirectly to memory elements through a system bus. The memory elements may include local memory employed during actual execution of the program code, bulk storage, and cache memory which provides temporary storage of at least some program code in order to reduce the number of times code must be retrieved from bulk storage during execution.

Additionally, it should be appreciated that each block in the flow chart or block chart and the combination of some blocks may be implemented by some computer program instructions. These computer program instructions may be provided to a general purpose computer, a specific purpose computer, or a processor of other programmable data processing device, to produce a machine, in which these instructions, when executed by the computers or the processor of other programmable data processing device, can create the means for implementing the functions indicated by the blocks of the block chart and/or the flow chart.

Although the present invention has been presented and described specifically by reference to the preferred embodiments, it is not intended to be exhaustive or limited the invention in the form disclosed. Many modifications on forms and details will be apparent to those ordinary skills in the art without deviating from the spirit and scope of the invention. The embodiments were chosen and described in order to best explain the principles of the invention, the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for joining tables in multiple heterogeneous distributed databases implemented by at least two data sources accessible to a federated database server over a network, said method comprising:
    transmitting from said federated database server a sub-command to a first of said data sources responsive to said federated database server receiving a data query;
    retrieving, with said federated database server, block data from said first data source related to said data query using block fetching according to said sub-command;
    transmitting, with said federated database server, at least a portion of said block data to a second of said data sources together with an instruction for said second data source to perform a join operation on said portion of said block data and a data table stored by said second data source related to said query;
    responsive to a size of non-related columns in said block data read from said first data source being larger than a size of a row pointer column, replacing columns in said block data unrelated to said join operation with a row pointer column when said block data is transmitted to said second data source;
    responsive to a size of non-related columns in said block data read from said first data source being smaller than said size of said row pointer column, transmitting all columns in said block data to said second data source for said join operation; and
    retrieving a result of said join operation with said federated database server.

2. The method according to claim 1, further comprising determining a size of said block data prior to said retrieving said block data from said first data source.

3. The method according to claim 2, in which said determining said size of said block data further comprises:
    calculating a first maximal row number by dividing a maximal memory size in said second data source available for performing said join operation by a maximal row size of a temporary table to be established in said second data source;
    calculating a second maximal row number by dividing a maximal memory size of an available local cache in said federated database server by a maximal row size of said block data; and
    assigning a smaller of said first and second maximal row numbers as a readable row number for said block data.

4. The method according to claim 1, further comprising: according to said row pointer column, directly merging, in said federated database server, said result of said join operation with said block data retrieved from said first data source to form a merged table.

5. The method according to claim 1, further comprising: directly storing said result of said join operation received from said second data source as a merged table.

6. The method according to claim 1, wherein said join operation comprises a hash join operation.

7. The method according to claim 1, wherein said join operation comprises a block nested loop join operation.

8. A system for joining tables in multiple heterogeneous distributed databases, said system comprising:
    a federated database server configured to be communicatively coupled to a first and second data sources over a network;
    in which said federated database server is configured to:
        transmit a sub-command to said first data source responsive to receiving a data query;
        retrieve block data from said first data source related to said data query using block fetching according to said sub-command;
        transmit at least a portion of said block data to said second data source together with an instruction for said second data source to perform a join operation on said portion of said block data and a data table stored by said second data source related to said query;
        responsive to a size of non-related columns in said block data read from said first data source being larger than a size of a row pointer column, replace columns in said block data unrelated to said loin operation with a row pointer column when said block data is transmitted to said second data source;
        responsive to a size of non-related columns in said block data read from said first data source being smaller than said size of said row pointer column, transmit all columns in said block data to said second data source for said loin operation; and
        retrieve a result of said join operation from said second data source.

9. The system according to claim 8, in which said federated database server is further configured to determine a size of said block data prior to retrieving said block data from said first data source.

10. The system according to claim 9, in which said federated database server is configured to determine said size of said block data by:
    calculating a first maximal row number by dividing a maximal memory size in said second data source available for performing said join operation by a maximal row size of a temporary table to be established in said second data source;
    calculating a second maximal row number by dividing a maximal memory size of an available local cache in said federated database server by a maximal row size of said block data; and
    assigning the smaller of said first and second maximal row numbers as a readable row number for said block data.

11. The system according to claim 8, in which said federated database server is further configured to, according to said row pointer column, directly merge said result of said join operation with said block data retrieved from the first data source to form a merged table.

12. The system according to claim 8, in which said federated database server is further configured to directly store said result of said join operation received from the second data source as a merged table.

13. The system according to claim 8, wherein said join operation comprises a hash join operation.

14. The system according to claim 8, wherein said join operation comprises a block nested loop join operation.

15. A computer program product for joining tables in multiple heterogeneous distributed databases implemented by at least two data sources, said computer program product comprising:
- a computer readable storage medium having computer readable program code embodied therewith, the computer readable program code comprising:
- computer readable program code configured to transmitting a sub-command to a first of said data sources responsive to receiving a data query;
- computer readable program code configured to retrieve block data from said first data source related to said data query using block fetching according to said sub-command;
- computer readable program code configured to transmit at least a portion of said block data to a second of said data sources together with an instruction for said second data source to perform a join operation on said portion of said block data and a data table stored by said second data source related to said query;
- computer readable program code configured to, responsive to a size of non-related columns in said block data read from said first data source being larger than a size of a row pointer column, replace columns in said block data unrelated to said join operation with a row pointer column when said block data is transmitted to said second data source;
- computer readable program code configured to transmit all columns in said block data to said second data source for said loin operation responsive to a size of non-related columns in said block data read from said first data source being smaller than said size of said row pointer column, and
- computer readable program code configured to retrieve a result of said join operation.

* * * * *